United States Patent [19]

Chung

[11] Patent Number: 5,178,770

[45] Date of Patent: Jan. 12, 1993

[54] METHOD OF TREATING BCTMP/CTMP WASTEWATER

[75] Inventor: Daniel K. Chung, Burlington, Canada

[73] Assignee: Nalco Canada Inc., Burlington, Canada

[21] Appl. No.: 729,052

[22] Filed: Jul. 12, 1991

[51] Int. Cl.$^5$ .............................................. C02F 1/56
[52] U.S. Cl. .................................. 210/705; 162/189; 210/725; 210/727; 210/728; 210/732; 210/734; 210/735; 210/736; 210/908
[58] Field of Search ................ 162/189; 210/712, 725, 210/727, 728, 732, 734, 735, 736, 928, 705

[56] References Cited

U.S. PATENT DOCUMENTS

| | | | |
|---|---|---|---|
| 3,141,816 | 7/1964 | Manley | 210/732 |
| 3,234,076 | 2/1966 | Goldsmith | 210/928 |
| 3,738,945 | 6/1973 | Panzer et al. | 210/736 |
| 3,843,589 | 10/1974 | Wartman | 260/33.4 R |
| 3,960,648 | 6/1976 | Nakajima et al. | 210/727 |
| 4,147,681 | 4/1979 | Lim et al. | 210/928 |
| 4,738,750 | 4/1988 | Ackel | 162/189 |

FOREIGN PATENT DOCUMENTS

| | | | |
|---|---|---|---|
| 1004782 | 2/1977 | Canada . | |
| 1150914 | 8/1983 | Canada . | |
| 1194254 | 10/1985 | Canada . | |
| 53-35254 | 4/1978 | Japan | 210/727 |
| WO89/02417 | 3/1989 | PCT Int'l Appl. | 210/928 |
| 454507 | 5/1988 | Sweden . | |
| 1113446 | 9/1984 | U.S.S.R. | 162/189 |

OTHER PUBLICATIONS

Product Literature—"The Berol Trawl-Method".
Product Literature—"The Berocell Polymer System for Water Clarification", *Berol Surface Chemistry Division*.
Product Literature—"The Krofta Supracell Zero Velocity Principle of Operation", *Krofta Engineering Corporation*, pp. 1–7.

*Primary Examiner*—Peter Hruskoci
*Attorney, Agent, or Firm*—Ailes, Ohlandt & Greeley

[57] ABSTRACT

A method of treating BCTMP/CTMP wastewater to improve retention and purification of cellulose fiber suspension and clarification of the BCTMP/CTMP wastewater which comprises the addition of a cationic, water soluble coagulant having a molecular weight less than 15,000,000 in an amount of about 1 to about 300 ppm; and a high molecular weight flocculant selected from the group consisting of: nonionic polymers having a molecular weight in the range between about 500,000 to about 30,000,000, low charge cationic polymers having a molecular weight in the range between about 5,000,000 to about 30,000,000, and low charge anionic polymers having a molecular weight in the range between about 5,000,000 to about 30,000,000, in an amount of about 0.1 to about 100 ppm.

15 Claims, No Drawings

METHOD OF TREATING BCTMP/CTMP WASTEWATER

The present invention relates generally to the clarification of bleached chemi-thermal mechanical pulp (BCTMP) and chemi-thermal mechanical pulp (CTMP) wastewater by pre-treatment with a cationic, water soluble coagulant and a high molecular weight flocculant. Pre-treatment of the BCTMP/CTMP wastewater with this novel combination of coagulant and flocculant provides for increased collection and removal of fibers, other solids and dissolved materials from a dissolved air flotation unit or a settling clarifier.

BACKGROUND OF THE INVENTION

Prior to delivery of paper and pulp wastewater to a dissolved air flotation (DAF) unit, e.g., a flotation Krofta, the wastewater is pre-treated with chemical additives which aid in the retention and separation of cellulose fiber suspension, fillers and other dispersed particles from the water.

In the dissolved air flotation process, clarification is achieved by forming micron-sized air bubbles in the water-fiber suspension which attach themselves to the suspended fiber or ash and float to the surface where they can be skimmed off with a mechanical scoop. The air bubbles are formed by dissolving air under 60–90 psi pressure. When released to the atmosphere in the DAF unit, the gas comes out of solution producing bubbles which average 20 microns in size.

Another advantage of dissolved air is that the lifting action of the bubbles tends to concentrate solids at the surface often making it possible to recover solids at concentrations of 2–4%. DAF units are typically designed such that the aerated mixture is laid in the unit at essentially zero velocity. In circular units this is accomplished by matching the speed of rotation of the inlet manifold to the flow. This minimizes turbulence and cross flow allowing the unit to take full advantage of coagulation, flocculation, and the lifting action of the bubbles.

Despite the inherent efficiency of DAF units and recent improvements and innovations in design, in most cases it is desirable and cost effective to enhance their performance by using chemical additives. Such additives can increase throughput and aid in the removal of fillers such as clay, titanium, and calcium carbonate which are often in a highly dispersed state due to the charge balance of the influent.

Canadian Patent No. 1,004,782 discloses the use of a phenol formaldehyde resin in combination with a high molecular weight polyethylene oxide to improve the retention at the dewatering of cellulose fiber suspensions. It was determined therein that the polyethylene oxide facilitates agglomeration of the flocculations formed with the phenol formaldehyde resin whereby retention and clarification are facilitated.

Swedish Patent Publication No. 454,507 (assigned to Berol Kemi Ab) discloses that the retention and/or purification of cellulose fiber suspensions and clarification of wastewater within the paper, pulp or board industry may be improved through pre-treatment with phenol formaldehyde resin and high molecular weight polyethylene oxide in combination with a cationic starch derivative or a cationic cellulose derivative.

Both of the aforementioned conventional pre-treatment methods utilize a dry particulate polyethylene oxide flocculant to facilitate retention and clarification. That is, these conventional methods call for the addition of polyethylene oxide to wastewater by diluting dry particulate polyethylene oxide with water to approximately 0.2% by weight immediately before addition.

To complicate matters more, conventional chemical pre-treatment of bleached chemi-thermal mechanical pulp (BCTMP) and chemi-thermal mechanical pulp (CTMP) has proved to be both difficult and expensive. BCTMP and CTMP wastewater pose effluent challenges for a number of reason, i.e., (1) they possess an extremely high cationic demand, (2) they are high in colloidal fines and suspended solids, (3) they can exhibit poor settleability characteristics, (4) they can be extremely high in soluble colour bodies, (5) they normally have effluent temperatures in excess of 30° C., (6) they readily generate an excess foaming tendency, and (7) the levels of BOD and COD are normally very high.

These factors can be found in almost all BCTMP wastewater streams. Each plant may have different methods of solids removal, i.e., settling clarifiers, dissolved air flotation, etc. Of particular importance in the treatment of BCTMP/CTMP wastewater are the following four factors.

During the refining stages, fines are released and removed to meet 'Freeness' targets. These extremely small particles possess a high negative charge density.

Poor settleability can hinder clarifier performance. BCTMP mills that utilize peroxide for their bleaching and where peroxide levels in the effluent are high, i.e., 200–600 ppm, steps must be taken to ensure the peroxide has decomposed fully prior to the effluent entering the clarifier. This can be accomplished by the use of sodium sulfite, organic matter (biological sludge), or acidic reduction. The latter has yet to be discussed but essentially peroxide is very unstable at low pH's around 4.0. The decomposition of peroxide in an acidic environment is twice that in an alkaline environment. This is another reason BCTMP mills use of sodium hydroxide is very high, i.e., to create a stable environment for the peroxide bleaching step.

Mechanical pulping practices are such that an extremely high amount of colour bodies, lignins are released during the impregnation or chip softening stages. Here caustic soda and steam are often used to soften the chips prior to refining. The colour bodies are released during this stage and normally in excessive amounts.

Because BCTMP effluents are alkaline in nature, this causes the effluent to be subject to foaming. This tendency cannot be fully eliminated with defoamers as the solids contamination is extremely high.

One conventional system used for pre-treating BCTMP wastewater is commonly referred to as the trawl-method. This method is applicable both for process water and wastewater clarification. The function of flocculation totally differs from the function of a conventional water clarification system. This method involves the addition of a phenol formaldehyde resin to the wastewater. The resin adheres onto fines, thereby creating anchoring places for the polymer. Thereafter, a solution of dry polyethylene oxide is added to the treated wastewater wherein the PEO binds to the sites covered with the resin. A network is formed consisting of fines and polymer. This network entraps other suspended particles.

Use of the aforementioned phenol formaldehyde resin/dry polyethylene oxide program has a number of disadvantages: (1) expensive; (2) ineffective in treating some wastewaters; and (3) the phenol formaldehyde resin is extremely toxic. Moreover, the resin forms colloidal particles at a pH below 9. The particle size depends not only upon the pH but also the soluble materials in the process water. Normally, the smaller the particle size, the higher the activity of the resin. The phenol formaldehyde resin will typically lose its effectiveness when the particle size becomes too large.

Another method for pre-treating BCTMP wastewater involves the principal of charge neutralization. This means that large amounts of decharging chemicals have to be added in order to flocculate large amounts of highly charged suspended material. For example, charge neutralization is accomplished by the addition of a preflocculant such as a metal salt, making the suspended particles attract one another forming microflocs. Thereafter, an anionic polyacrylamide is added to form bridges between the microflocs resulting in larger flocs.

The pre-treatment program of the present invention is much more cost effective than the conventional phenol formaldehyde resin/dry PEO program. It is also more flexible and covers a wider range of waste compositions, not satisfactorily treatable with the resin/dry PEO program. The present inventor has discovered through extensive experimentation that cationic, water soluble coagulants demonstrate more effectiveness in satisfying the cationic charge demand of the process than conventional phenol formaldehyde resins. These cationic coagulants also help to flocculate the fine suspended substances.

In situations where it is not cost effective to add low molecular weight cationic coagulants (i.e., coagulants having a molecular weight less than about 1,000,000) due to the large cationic demand of the wastewater, the present inventor has discovered that high molecular weight, low cationic charge coagulants (i.e., coagulants having a molecular weight in the range between about 9,000,000 to about 15,000,000) can readily be substituted therefor. Such high molecular weight coagulants are less affected by the anionic trash in the pulp and paper process.

The present invention also provides many additional advantages which shall become apparent as described below.

SUMMARY OF THE INVENTION

The present invention is directed to a method for pre-treating BCTMP/CTMP wastewater in order to increase the amount of fibers, other solids, and dissolved materials, collected and removed during processing by a dissolved air flotation unit or settling clarifier.

This method of pre-treating BCTMP/CTMP wastewater to improve retention and purification of cellulose fiber suspension and clarification of the BCTMP/CTMP wastewater involves the addition thereto of a cationic, water soluble coagulant having a molecular weight less than 15,000,000 in an amount of about 1 to about 300 ppm; and a high molecular weight flocculant selected from the group consisting of: nonionic polymers having a molecular weight in the range between about 500,000 to about 30,000,000, low charge cationic polymers having a molecular weight in the range between about 5,000,000 to about 30,000,000, and low charge anionic polymers having a molecular weight in the range between about 5,000,000 to about 30,000,000, in an amount of about 0.1 to about 100 ppm.

The cationic coagulant is either a low molecular weight coagulant or high molecular weight, low cationic charge coagulant. The low molecular weight coagulant is selected from the group consisting of: polycyandiamide formaldehyde polymers, amphoteric polymers, diallyl dimethyl ammonium chloride (DADMAC) polymers, diallyaminoalkyl (meth) acrylate polymers, dialkylaminoalkyl (meth) acrylamide polymers, a polymer of dimethylamine/epichlorohydrin (DMA/EPI), a copolymer of diallyl dimethylammonium chloride (DADMAC) and acrylamide, a copolymer of diallylaminoalkyl (meth) acrylates and acrylamide, a copolymer of dialkylaminoalkyl (meth) acrylamides and acrylamide, polyethylene imine (PEI), and polyamine. The preferred coagulants are polymers of dimethylamine/epichlorohydrin, copolymers of acrylamide and diallyl dimethyl ammonium chloride, and copolymers of acrylamide and dialkylaminoalkyl (meth) acrylamide. Molar ratios of the mononers are from about 1% to about 100% cationic.

High molecular weight, low cationic charge coagulants are preferably acrylamide polymers selected from the group consisting of dimethylamino ethylacrylate methyl chloride quaternary (DMAEA.MCQ)/acrylamide copolymers, dimethylaminoethyl methacrylate methyl chloride quaternary (DMAEM.MCQ)/acrylamide copolymers, dimethylaminoethyl methacrylate dimethyl sulfate quaternary (DMAEM.DMS)/acrylamide copolymers; and diallyl dimethyl ammonium chloride/acrylamide copolymers.

The high molecular weight flocculants are nonionic, low charge cationic, or low charge anionic polymers. Nonionic flocculants are polymers which contain no charge on the molecule and which have a molecular weight in the range between about 500,000 to 30,000,000, e.g., polyethylene oxide and polyacrylamide. The low charge cationic or anionic flocculants are preferably those having below 5 mole % charged group, more preferably below 3 mole %.

It is preferable to use a nonionic polyethylene oxide flocculant which comprises: a particulate ethylene oxide polymer present in an amount of between about 20 to about 35% by weight; an inert liquid vehicle comprising a mixture of a glycol which is present in an amount between about 25 to about 30% by weight, and glycerine which is present in an amount between about 45 to about 50% by weight, wherein the specific gravity of the ethylene oxide polymer is approximately the same as the specific gravity of the inert liquid vehicle; and a suspension agent which is present in an amount between about 0.4 to about 0.6% by weight, wherein the polyethylene oxide has a viscosity in the range between about 1800 to about 5900 cps, more preferably in the range between about 1800 to about 3200 cps.

The low charge cationic and anionic flocculants are those polymers having up to 5 mole % charged units on the molecule and having a molecular weight of 5,000,000 to 30,000,000.

The pre-treatment program according to the present invention is particularly suited for use in dissolved air flotation or settling clarifier devices. The order of addition is typically cationic coagulant followed by high molecular weight flocculant. For best results it is advisable to allow 5-30 seconds mixing between each addition.

Other and further objects, advantages and features of the present invention will be understood by reference to the following specification.

DESCRIPTION OF THE PREFERRED EMBODIMENTS

Paper, pulp and board wastewater is chemically pre-treated to improve the retention and/or purification of cellulose fiber suspensions, and clarification thereof. The wastewater is typically pre-treated prior to clarification in a dissolved air flotation (DAF) unit where the recovered solids and colloidal material are floated to the surface of the DAF unit and skimmed off by a mechanical scoop. The resultant clarified water is thereafter sent on for further processing.

This chemical pre-treatment can also be applied to wastewater being delivered to a settling clarifier for primary clarification of effluents from a pulp or paper production process.

The chemical pre-treatment program involves a method of treating BCTMP/CTMP wastewater to improve retention and purification of cellulose fiber suspension and clarification of the BCTMP/CTMP wastewater. The following polymers are added to the wastewater according to this program: a cationic, water soluble coagulant having a molecular weight less than 15,000,000 in an amount of about 1 to about 300 ppm; and a high molecular weight flocculant selected from the group consisting of: nonionic polymers having a molecular weight in the range between about 500,000 to about 30,000,000, low charge cationic polymers having a molecular weight in the range between about 5,000,000 to about 30,000,000, and low charge anionic polymers having a molecular weight in the range between about 5,000,000 to about 30,000,000, in an amount of about 0.1 to about 100 ppm.

LOW MOLECULAR WEIGHT COAGULANTS

The low molecular weight coagulant is selected from the group consisting of: polycyandiamide formaldehyde polymers, amphoteric polymers, diallyl dimethyl ammonium chloride (DADMAC) polymers, dialyaminoalkyl (meth) acrylate polymers, dialkylaminoalkyl (meth) acrylamide polymers, a polymer of dimethylamine/epichlorohydrin (DMA/EPI), a copolymer of diallyl dimethylammonium chloride (DADMAC) and acrylamide, a copolymer of diallylaminoalkyl (meth) acrylates and acrylamide, a copolymer of dialkylaminoalkyl (meth) acrylamides and acrylamide, polyethylene imine (PEI), and polyamine.

The preferred low molecular weight coagulants are copolymers of acrylamide and diallyl dimethyl ammonium chloride, copolymers of acrylamide and dialkyl-aminoalkyl (meth) acrylamide, polymers of dimethylamine/epichlorohydrin (DMA/EPI), diallyl dimethylammonium chloride (DADMAC), and polyethylene imine (PEI). Molar ratios of the mononers are from about 1% to about 100% cationic.

Polymers of DMA/EPI are disclosed in Canadian Patent No. 1,150,914 (Molnar), which issued Aug. 2, 1983. These low molecular weight coagulants comprise a water-dispersible polyquaternary polymer of essentially linear structure consisting essentially of the difunctional reaction product of a lower dialkylamine and a difunctional epoxy compound selected from the group consisting of epihalohydrins, diepoxides, percursors of epihalohydrins and diepoxides which under alkaline conditions are readily converted into the corresponding epoxy compounds, and mixtures thereof. A preferred species of polymers of the type described above are those prepared by using as the reactants epichlorohydrin and dimethylamine. Polyquaternary polymers of the type described above and their method of preparation are described in U.S. Pat. No. 3,738,945. The polymers of dimethylamine/epichlorohydrin have a molar ratio in the range between about 0.85:1 to about 1:1.

Diallyl dimethylammonium chloride (DADMAC) is disclosed in U.S. Pat. No. 3,288,770 along with its typical methods of preparation. Moreover, it is known that DADMAC assists in reducing the amount of colloidal pitch particles in aqueous pulp as shown in Canadian Patent No. 1,194,254 (Molnar).

HIGH MOLECULAR WEIGHT, LOW CATIONIC CHARGE COAGULANTS

High molecular weight, low cationic charge coagulants are preferably acrylamide polymers selected from the group consisting of dimethylamino ethylacrylate methyl chloride quaternary (DMAEA.MCQ)/acrylamide copolymers, dimethylaminoethyl methacrylate methyl chloride quaternary (DMAEM.MCQ)/acrylamide copolymers, dimethylaminoethyl methacrylate dimethyl sulfate quaternary (DMAEM.DMS)/acrylamide copolymers; and diallyl dimethyl ammonium chloride/acrylamide copolymers. These high molecular weight coagulants can be prepared using conventional latex polymerization techniques.

Some preferred high molecular weight coagulants are: (1) a cationic copolymer of DMAEA.MCQ/acrylamide with 3 mole % of DMAEA.MCQ; (2) a cationic copolymer of DMAEA.MCQ/acrylamide with 1 mole % of DMAEA.MCQ; (3) a cationic copolymer of DADMAC/acrylamide with 5 mole % of DADMAC; and (4) a cationic copolymer of DMAEM.DMS/acrylamide with 5 mole % of DMAEM.DMS.

HIGH MOLECULAR WEIGHT FLOCCULANTS

The preferred high molecular weight flocculant is either nonionic, low charge cationic, or low charge anionic. Nonionic flocculants are polymers which contain no charge on the molecule and have a molecular weight in the range between about 500,000 to 30,000,000, e.g., polyethylene oxide and polyacrylamide. The low charge cationic or anionic flocculants are preferably those having below 5 mole % charged group, more preferably below 3 mole % charged units on the molecule and a molecular weight in the range between about 5,000,000 to about 30,000,000.

It is preferable to pre-treat the wastewater with a flocculant comprising a liquid suspension of polyethylene oxide which exhibits a much lower viscosity even at a higher concentration (based on percent active), i.e., a product which is more pumpable, goes into solution much faster than dry polyethylene oxide, and exhibits a replacement ratio of 2:1 when compared to dry polyethylene oxide. It is believed that possible explanations for the markedly improved viscosity and flow rates of liquid suspension of polyethylene oxide verses dry polyethylene oxide are: (1) more effective solubilization of the liquid suspension due to the presence of a wetting agent, and (2) shear sensitivity of the polyethylene oxide (i.e., shear degradation). That is, liquid suspension of polyethylene oxide facilitates solution of the polyethylene oxide particles at a faster rate and higher level of activity than the conventional dry feeder approach.

Although it has not been applied to the treatment of pulp, paper and board industry wastewater, U.S. Pat. No. 3,843,589 (Wartman), which issued on Oct. 22, 1974, does disclose the forming of a pumpable slurry of polyethylene oxide. According to the Wartman patent, a stable slurry formulation may be formed by mixing particulate polyethylene oxide, an inert liquid vehicle of a glycol and glycerine, and a thickening agent, e.g., colloidal silica. This patent was particularly concerned with the pumping of polyethylene oxide slurries against a head pressure using some type of positive displacement pump, e.g., gear pumps, moyno pumps, and diaphragm pumps. These pumping configurations can result in a phenomenon called "synaeresis", i.e., liquid carrier medium flows back through the clearance while the particles are not free to do so, thus resulting in the forward chamber of the pump becoming filled with semi-dry polymer due to the backflow of the liquid carrier medium. This liquid suspension exhibits high resistance to stratification and molecular weight degradation of the active polymer.

The primary difference between the liquid suspension of polyethylene oxide and that disclosed in the Wartman patent is that the liquid suspension used according to the present invention produces a flocculating agent which is suitable for use as a pre-treating aid in paper and pulp wastewater. Moreover, the liquid polyethylene oxide of the present invention utilizes a suspension agent to assist in maintaining the polyethylene oxide in suspension within the inert liquid vehicle. It also results in a liquid suspension which has a much lower viscosity than that of Wartman, and which is better suited for use as a flocculant in the pre-treatment of paper and pulp wastewater.

One reason for the drastic difference in viscosity is that the Wartman patent discloses the use of a thickening agent, such as colloidal silica, which does not reduce viscosity as the solids loading is increased. To the contrary, the suspension agent used in the flocculating agent of the present invention provides for a dramatic reduction in viscosity, increased stability and an increased solids loading.

One preferred formulation of liquid polyethylene oxide which is to be used as a flocculant is as follows: a particulate ethylene oxide polymer present in an amount of between about 20 to about 35% by weight; an inert liquid vehicle comprising a mixture of a glycol which is present in an amount between about 25 to about 30% by weight, and glycerine which is present in an amount between about 45 to about 50% by weight; and a suspension agent which is present in an amount between about 0.4 to about 0.6% by weight.

The ethylene oxide polymer is preferably polyethylene oxide having a molecular weight in the range between about 500,000 to about 30,000,000, preferably 5,000,000 to about 20,000,000, more preferably about 8,000,000 to about 12,000,000.

The glycol is preferably propylene glycol. Although it is also possible that the glycol could also be 1,3-butylene glycol, 1,6-hexylene glycol, ethylene glycol, and dipropylene glycol. It is also possible that the glycol could be replaced with butyl carbitol.

It may also be possible to substitute any of the following compositions for glycerine: 1,2,3,4,5,6 hexane hexol, 1,2,3,4 butane tetrol, pentaerythritol and ethylene carbonate.

The suspension agent comprises a mixture of a polymeric fatty acid ester and another dispersing agent. An example of a preferred polymeric fatty acid ester is a 40% polymeric fatty acid ester, e.g., Atkemix Hypermer LP6 sold by ICI. The Atkemix Hypermer LP6 fatty acid ester is preferably combined with another dispersing agent such as Atkemix Hypermer PS2 sold by ICI. Other potential dispersing agents are stearic monoethanolamide, N,N'-ethylene bis stearamide, polyacrylic acid, polyacrylate, and aluminum stearate. The suspension agent provides improved wetting, dispersion, stabilization and fluidization which can give rise to a variety of effects which may be used to advantage in many particulate suspensions. The effects of the suspension agent on the liquid suspension of polyethylene oxide is a dramatic viscosity reduction, increased stability and increased solids loading, i.e., can attain higher percent by weight polyethylene oxide than conventional polyethylene suspensions.

The polyethylene oxide flocculant has a Brookfield viscosity in the range between about 1800 to about 5900, and more preferably 1800 to about 3200 cps. The specific gravity of the ethylene oxide polymer is approximately the same as the specific gravity of the inert liquid vehicle. Specific gravity of the ethylene oxide polymer is in the range between about 1.13 to about 1.22, and the specific gravity of the inert liquid vehicle is in the range between about 1.11 to about 1.23.

A particularly effective liquid suspension of polyethylene oxide includes 25.8% propylene glycol, 43.4% glycerin, 30% dry polyethylene oxide, 0.15% Atkemix Hypermer LP6 fatty acid ester, 0.15% Atkemix Hypermer PS2 dispersing agent, and 0.5% of an anionic surfactant, such as Atsurf 595.

The preferred liquid polyethylene oxide is prepared by initially charging a reactor vessel with 27.6% by weight of a propylene glycol and 47% by weight of a 95% solution of glycerine with agitation. Cool the mixture to approximately 15°-25° C., more preferably between about 18°-22° C. The use of temperatures above 25° C. can result in products which are more viscous than desirable. During mixing, accurately charge the reactor vessel with a suspension agent comprising 0.2% by weight of a 40% polymeric fatty acid ester and 0.2% by weight of a dispersing agent. Continue to mix rapidly and slowly charge the reactor vessel with 25% by weight of a dry particulate polyethylene oxide. If added too rapidly, the polyethylene oxide tends to form lumps in the batch which are difficult to break up with mixing. After all of the polyethylene oxide is charged into the vessel, mix for an additional hour.

An example of a low charge cationic flocculant is a high molecular weight cationic copolymer of methacrylamidopropyltrimethyl ammonium chloride (MAPTAC) and acrylamide having 5.4 mole % MAPTAC.

Examples of anionic flocculants are a high molecular weight anionic copolymer of acrylic acid and acrylamide having 1 mole % acrylic acid, a high molecular weight anionic copolymer of acrylic acid and acrylamide with 6 mole of acrylic acid, and a high molecular weight anionic copolymer of acrylic acid and acrylamide with 9 mole % of acrylic acid.

The Krofta Supracell (Manufactured by Krofta Engineering Corporation) is an example of a dissolved air flotation device wherein solids removal and collection can be enhanced by the chemical pre-treatment program of the present invention. The device removes solids by means of air flotation and sedimentation. The rotation of the Supracell is synchronized so that the water in the tank achieves 'zero velocity' during flotation which causes an increase in the efficiency of flotation.

The advantages of the present invention over the conventional chemical pre-treatment programs are clearly demonstrated by the following examples.

EXAMPLE 1

The data listed in Table 1 below demonstrates that pre-treatment of BCTMP wastewater with phenol formaldehyde resin does not assist the polyethylene oxide flocculant in the removal of solids. The nonionic polyethylene oxide flocculant used in this experiment is 25% solids of polyethylene oxide suspended in a liquid medium of propylene glycol and glycerine with a suspension aid of a Atkemix Hypermer LP6 fatty ester and an Atkemix Hypermer PS2 dispersion agent. This experiment was conducted at 16° C., a pH of 8.3, and a total solids (i.e., fiber, colloidal and dissolved solids) of 1.83%.

TABLE 1

| Sample | Dosage | pH | TDCS | Ash | Organics | % Inorganics | % Organics | Reduction Inorganics | Reduction Organics | TDCS* |
|---|---|---|---|---|---|---|---|---|---|---|
| Blank | | 8.15 | 17740 | 6340 | 11400 | 35.7 | 64.3 | | | |
| PEO | 50 | | 15520 | 6580 | 8940 | 42.4 | 57.6 | −3.8 | 21.6 | 12.5 |
| PEO | 100 | | 11320 | 5380 | 5940 | 47.5 | 52.5 | 15.1 | 47.9 | 36.2 |
| PEO | 150 | | 9700 | 4760 | 4940 | 49.1 | 50.9 | 24.9 | 56.7 | 45.3 |
| Blank | | 7.10 | 17460 | 7060 | 10380 | 40.5 | 59.5 | | | |
| PEO | 50 | | 13040 | 5700 | 7340 | 43.7 | 56.3 | 19.5 | 29.3 | 25.3 |
| PEO | 100 | | 11420 | 6400 | 5020 | 56.0 | 44.0 | 9.6 | 51.6 | 34.6 |
| PEO | 150 | | 11030 | 4460 | 5570 | 44.5 | 55.5 | 37.0 | 46.3 | 42.6 |
| Blank | | 5.90 | 16084 | 5760 | 10324 | 35.8 | 64.2 | | | |
| PEO | 50 | | 16260 | 6540 | 9720 | 40.2 | 59.8 | −13.5 | 5.9 | −1.1 |
| PEO | 100 | | 12500 | 4820 | 7680 | 38.6 | 61.4 | 16.3 | 25.6 | 22.3 |
| PEO | 150 | | 10810 | 4540 | 6270 | 42.0 | 58.0 | 21.2 | 39.3 | 32.8 |
| Blank | | 5.00 | 16760 | 5820 | 10940 | 34.7 | 65.3 | | | |
| PEO | 50 | | 13946 | 4260 | 9686 | 30.5 | 69.5 | 26.8 | 11.5 | 16.8 |
| PEO | 100 | | 10858 | 4700 | 6158 | 43.3 | 56.7 | 19.2 | 43.7 | 35.2 |
| PEO | 150 | | 9604 | 5820 | 3784 | 60.6 | 39.4 | 0.0 | 65.4 | 42.7 |
| Blank | | 8.15 | 16058 | 4900 | 11158 | 30.5 | 69.5 | | | |
| Resin/PEO | 50/100 | | 11260 | 4500 | 6760 | 40.0 | 60.0 | 8.2 | 39.4 | 29.9 |
| Resin/PEO | 100/100 | | 10458 | 4675 | 5783 | 44.7 | 55.3 | 4.6 | 48.2 | 34.9 |
| Resin/PEO | 150/100 | | 10858 | 4700 | 6158 | 43.3 | 56.7 | 4.1 | 44.8 | 32.4 |
| Blank | | 7.10 | 15878 | 5120 | 10758 | 32.2 | 67.8 | | | |
| Resin/PEO | 50/100 | | 10838 | 4680 | 6158 | 43.2 | 56.8 | 8.6 | 42.8 | 31.7 |
| Resin/PEO | 100/100 | | 10658 | 4780 | 5878 | 44.8 | 55.2 | 6.6 | 45.4 | 32.9 |
| Resin/PEO | 150/100 | | 10308 | 4480 | 5828 | 43.5 | 56.5 | 12.5 | 45.8 | 35.1 |
| Blank | | 5.90 | 16420 | 5320 | 11100 | 32.4 | 67.6 | | | |
| Resin/PEO | 50/100 | | 12650 | 5120 | 7530 | 40.5 | 59.5 | 3.8 | 32.2 | 23.0 |
| Resin/PEO | 100/100 | | 11588 | 5700 | 5888 | 49.2 | 50.8 | −7.1 | 47.0 | 29.4 |
| Resin/PEO | 150/100 | | 11214 | 4500 | 6714 | 40.1 | 59.9 | 15.4 | 39.5 | 31.7 |
| Blank | | 5.00 | 16500 | 5280 | 11220 | 32.0 | 68.0 | | | |
| Resin/PEO | 50/100 | | 10340 | 4740 | 5600 | 45.8 | 54.2 | 10.2 | −5.9 | 37.3 |
| Resin/PEO | 100/100 | | 10060 | 4740 | 5320 | 47.1 | 52.9 | 10.2 | −0.6 | 39.0 |
| Resin/PEO | 150/100 | | 10184 | 5480 | 4704 | 53.8 | 46.2 | −3.8 | 11.0 | 1.5 |

*Designates total dissolved and colloidal solids.

EXAMPLE 2

The samples set forth below in Table 2 demonstrate that although polyethylene oxide is effective in removing fibers and colloidal materials from BCTMP effluent, a pre-treatment program which adds a low molecular weight coagulant (e.g., a polymer of dimethylamine/epichlorohydrin (DMA/EPI) having a molar ratio of 0.85:1.0) in addition to a high molecular weight flocculant such as a liquid suspension of polyethylene oxide (e.g., a 25% solids of polyethylene oxide suspended in a liquid medium of propylene glycol and glycerine with a suspension aid of a Atkemix Hypermer LP6 fatty ester and an Atkemix Hypermer PS2 dispersion agent) is much more cost effective.

This experiment was conducted at 20° C., a pH of 4.0, and a total solids content (i.e., fiber, colloidal and dissolved solids) of 1.83%.

TABLE 2

| Sample | Dosage (ppm) | Turbidity % Transmittance* |
|---|---|---|
| Blank | 0 | 24 |
| PEO | 10 | 27 |
| PEO | 20 | 33 |
| PEO | 40 | 49 |
| PEO | 60 | 59 |
| PEO | 80 | 67 |
| PEO | 90 | 71 |
| PEO | 100 | 78 |
| PEO | 110 | 83 |
| [DMA/EPI]/PEO | 0/0 | 24 |
| [DMA/EPI]/PEO | 0/40 | 49 |
| [DMA/EPI]/PEO | 20/40 | 57 |
| [DMA/EPI]/PEO | 40/40 | 67 |
| [DMA/EPI]/PEO | 60/40 | 72 |
| [DMA/EPI]/PEO | 80/40 | 74 |
| [DMA/EPI]/PEO | 0/20 | 33 |
| [DMA/EPI]/PEO | 20/20 | 38 |
| [DMA/EPI]/PEO | 40/20 | 52 |
| [DMA/EPI]/PEO | 60/20 | 57 |
| [DMA/EPI]/PEO | 80/20 | 64 |

*Higher value of % transmittance indicates better clarity, lower turbidity.

The aforementioned data demonstrates that a low molecular weight coagulant, such as a polymer of DMA/EPI having a mole ratio of 0.85:1, is excellent in reducing the total suspended solids (TSS) of the effluent wastewater. It also became apparent that a high molecular weight flocculant, such as PEO, was needed for proper flocculation of the wastewater.

EXAMPLE 3

The samples set forth below in Table 3 demonstrate that phenol formaldehyde resin does not remove colloidal material, that the sample dosage corresponds to the solids level of the effluent treated, and that the coagulant of DMA/EPI appears to be an excellent cationic source. A DMA/EPI polymer having a mole ratio of 1:1 and another DMA/EPI polymer having a mole ratio of 0.85:1 were both added to wastewater together with a high molecular weight flocculant (e.g., a 25% solids of polyethylene oxide suspended in a liquid medium of propylene glycol and glycerine with a suspension aid of a Atkemix Hypermer LP6 fatty ester and an Atkemix Hypermer PS2 dispersion agent).

This experiment was conducted at 20° C., a pH of 4.2, and a total solids content (i.e., fiber, colloidal and dissolved solids) of 1.83%.

TABLE 3

| Sample | Dosage (ppm) | Turbidity % Transmittance* |
|---|---|---|
| PEO | 40 | 48 |
| Resin/PEO | 100/40 | 51 |
| Resin/PEO | 150/40 | 51 |
| Resin/PEO | 200/40 | 48 |
| Resin/PEO | 50/40 | 47 |
| Resin/PEO | 100/40 | 48 |
| Resin/PEO | 150/40 | 48 |
| Resin/PEO | 200/40 | 47 |
| Resin/PEO | 100/40 | 55 |
| Resin/PEO | 200/40 | 56 |
| [DMA/EPI]/PEO** | 20/40 | 70 |
| [DMA/EPI]/PEO** | 40/40 | 76 |
| [DMA/EPI]/PEO*** | 20/40 | 65 |
| [DMA/EPI]/PEO*** | 40/40 | 68 |
| DADMAC/PEO | 20/40 | 64 |
| DADMAC/PEO | 40/40 | 71 |
| DADMAC/PEO | 20/40 | 61 |
| DADMAC/PEO | 40/40 | 67 |
| Cationic Potato Starch/PEO | 20/40 | 49 |
| Cationic Potato Starch/PEO | 40/40 | 57 |
| Cationic Potato Starch/PEO | 60/40 | 68 |
| Cationic Potato Starch/PEO | 80/40 | 74 |
| Cationic Potato Starch/PEO | 100/40 | 64 |
| Cationic Potato Starch/PEO | 200/40 | 68 |
| [DMA/EPI]/PEO**** | 0/10 | 58 |
| [DMA/EPI]/PEO**** | 10/10 | 72 |
| [DMA/EPI]/PEO**** | 20/10 | 78 |
| [DMA/EPI]/PEO**** | 30/10 | 82 |
| [DMA/EPI]/PEO**** | 40/10 | 90 |

*Higher value of % transmittance indicates better clarity, lower turbidity.
**A polymer of DMA/EPI having a mole ratio of 1:1.
***A polymer of DMA/EPI having a mole ratio of 0.85:1.
****The effluent solids were reduced by half (i.e., 250 mL effluent and 250 mL tap water) and the polymer of DMA/PEI had a mole ratio of 0.85:1.

EXAMPLE 4

The samples set forth in Table 4 demonstrate that a liquid suspension of PEO by itself and PEO combined with a DMA/EPI polymer both work better at lower pH values, that mixing a 350 rpm for prolonged periods of time does not reduce the activity of the liquid suspension of PEO, and that liquid suspension of PEO is stable for at least one week.

This experiment was conducted at 20° C., a pH of 8.2, and a total solids content (i.e., fiber, colloidal and dissolved solids) of 1.83%.

TABLE 4

| Sample | Dosage (ppm) | Turbidity % Transmittance* |
|---|---|---|
| PEO | 0 | 18 |
| PEO | 20 | 35 |
| PEO | 40 | 45 |
| PEO | 60 | 50 |
| PEO | 80 | 55 |
| PEO | 90 | 58 |
| PEO | 100 | 58 |
| PEO | 110 | 64 |
| [DMA/EPI]/PEO** | 10/40 | 44 |
| [DMA/EPI]/PEO** | 20/40 | 47 |
| [DMA/EPI]/PEO** | 30/40 | 50 |

TABLE 4-continued

| Sample | Dosage (ppm) | Turbidity % Transmittance* |
|---|---|---|
| [DMA/EPI]/PEO** | 40/40 | 53 |
| [DMA/EPI]/PEO** | 60/40 | 59 |
| [DMA/EPI]/PEO** | 80/40 | 65 |
| [DMA/EPI]/PEO** | 100/40 | 73 |
| [DMA/EPI]/PEO** | 200/40 | 82 |
| Resin/PEO | 20/40 | 42 |
| Resin/PEO | 40/40 | 41 |
| Resin/PEO | 60/40 | 40 |
| Resin/PEO | 80/40 | 41 |
| Resin/PEO | 200/40 | 39 |
| Resin/PEO | 20/40 | 45 |
| Resin/PEO | 40/40 | 46 |
| Resin/PEO | 60/40 | 45 |
| Resin/PEO | 80/40 | 46 |
| Resin/PEO | 200/40 | 45 |
| Resin/PEO | 20/40 | 44 |
| Resin/PEO | 40/40 | 44 |
| Resin/PEO | 60/40 | 43 |
| Resin/PEO | 80/40 | 45 |
| Resin/PEO | 200/40 | 46 |
| Polyacrylamide | 20 | 33 |
| Polyacrylamide | 40 | 41 |
| Polyacrylamide | 60 | 43 |
| Polyacrylamide | 80 | 45 |
| Polyacrylamide | 100 | 44 |
| Polyacrylamide | 120 | 46 |
| Polyacrylamide | 140 | 45 |
| [DMA/EPI]/PEO** | 20/20 | 44 |
| [DMA/EPI]/PEO** | 40/20 | 48 |
| [DMA/EPI]/PEO** | 60/20 | 52 |
| [DMA/EPI]/PEO** | 80/20 | 57 |
| PEO*** | 10 | 32 |
| PEO*** | 20 | 36 |
| PEO*** | 40 | 47 |
| PEO*** | 60 | 55 |
| Pass/PEO**** | 50/40 | 44 |
| Pass/PEO**** | 100/40 | 44 |
| Pass/PEO**** | 150/40 | 43 |
| Pass/PEO**** | 200/40 | 44 |

*Higher value of % transmittance indicates better clarity, lower turbidity.
**A polymer of DMA/EPI having a mole ratio of 0.85:1.
***PEO tested after 2 hours of mixing at 350 rpm.
****Polyaluminum Silicate Sulfate (Pass).

EXAMPLE 5

The data set forth in Table 5 below demonstrates the effect of pH on the effectiveness of the pre-treatment program according to the present invention. The PEO is the liquid suspension used in the earlier examples.

This experiment was conducted at 20° C., a pH of 4.3 unless stated otherwise, and a total solids content (i.e., fiber, colloidal and dissolved solids) of 1.83%.

TABLE 5

| Sample | pH | Dosage (ppm) | Turbidity % Transmittance* |
|---|---|---|---|
| Blank | | | 24 |
| PEO | | 40 | 42 |
| [DMA/IPE]/PEO** | | 40/40 | 55 |
| [DMA/IPE]/PEO** | | 60/40 | 61 |
| [DMA/IPE]/PEO** | | 100/40 | 80 |
| [DMA/IPE]/PEO** | 4.5 | 40/40 | floating fiber |
| [DMA/IPE]/PEO** | 4.5 | 60/40 | floating fiber |
| [DMA/IPE]/PEO** | 5.0 | 20/40 | 47 |
| [DMA/IPE]/PEO** | 5.0 | 40/40 | 53 |
| [DMA/IPE]/PEO** | 6.1 | 0/40 | 42 |
| [DMA/IPE]/PEO** | 6.1 | 20/40 | 44 |
| [DMA/IPE]/PEO** | 6.1 | 40/40 | 52 |
| [DMA/IPE]/PEO** | 6.9 | 20/40 | 44 |
| [DMA/IPE]/PEO** | 6.9 | 40/40 | 51 |

*Higher value of % transmittance indicates better clarity, lower turbidity.
**A polymer of DMA/EPI having a mole ratio of 0.85:1.

EXAMPLE 6

The samples set forth in Table 6 below compare the efficiency of solids removal between the treatment program of the present invention and conventional phenol formaldehyde resin programs.

TABLE 6

| Sample No. | PEO* (ppm) | Resin** (ppm) | DMA/EPI*** (ppm) | DMAEA.MCQ/**** Acrylamide(ppm) | TSS (in) | TSS (out) | Turb. in/out | Efficiency % Removal |
| --- | --- | --- | --- | --- | --- | --- | --- | --- |
| 1 | 29 | 30 | 0 | 0 | 940 | 770 | >100/79 | 18.1 |
| 2 | 29 | 0 | 0 | 0 | 1980 | 890 | >100/96 | 55.0 |
| 3 | 29 | 0 | 0 | 30 | 2480 | 970 | >100/91 | 60.9 |
| 4 | 29 | 0 | 30 | 0 | 1920 | 1150 | >100/90 | 40.1 |
| 5 | 29 | 0 | 0 | 30 | 4160 | 1340 | >100/87 | 67.8 |
| 6 | 8, Dry | 30 | 0 | 0 | 1300 | 1140 | >100/>100 | 12.3 |
| 7 | 10 | 0 | 0 | 30 | 3180 | 950 | >100/99 | 70.1 |
| 8 | 10 | 0 | 90 | 0 | 1650 | 1130 | | 31.5 |
| 9 | 10 | 0 | 0 | 15 | 5770 | 1010 | | 82.5 |
| 10 | 20 | 0 | 0 | 15 | 3860 | 970 | | 75.0 |
| 11 | 10 | 0 | 0 | 10 | 3540 | 930 | | 73.7 |

*A liquid suspension of PEO.
**A phenol formaldehyde resin.
***A polymer of DMA/EPI having a mole ratio of 0.85:1.0.
****A cationic copolymer of DMAEA.MCQ/acrylamide with medium molecular weight and 3 mole % DMAEA.MCQ.

EXAMPLE 7

The comparative examples listed in Table 7 below demonstrate that the pre-treatment program according to the present invention are more effective than conventional chemical treatments in solids removal.

TABLE 7

| Sample | Dosage (ppm) | Turbidity NTU |
| --- | --- | --- |
| EPO | 6 | 36 |
| [DMA/EPI]/PEO* | 30/6 | 29 |
| Resin/PEO** | 30/6 | 47 |
| [DMAEA.MCQ/AA]/PEO*** | 30/6 | 25 |
| [DMAEA.MCQ/AA]/PEO*** | 20/6 | 26 |
| [DMAEA.MCQ/AA]/PEO*** | 10/6 | 27 |
| [DMAEA.MCQ/AA]/PEO*** | 30/3 | 27 |
| [DADMAC/AA]/PEO**** | 30/6 | 25 |
| [DADMAC/AA]/PEO**** | 30/6 | 24 |
| [DADMAC/AA]/PEO**** | 30/0 | 71 |
| [DADMAC/AA]/PEO**** | 20/6 | 23 |
| [DADMAC/AA]/PEO**** | 10/6 | 24 |
| [DMAEA.MCQ/AA]/PEO*** | 30/6 | 30 |
| [DADMAC/AA]/Polyacrylamide# | 30/30 | 66 |
| [DADMAC/AA]/Polyacrylamide# | 30/40 | 61 |

*A polymer of DMA/EPI having a mole ratio of 0.85:1.
**A phenol formaldehyde resin.
***A cationic copolymer of DMAEA.MCQ/acrylamide of medium molecular weight and 3 mole % DMAEA.MCQ.
****A cationic copolymer of DADMAC/acrylamide of medium molecular weight and 5 mole % DADMAC.
A cationic copolymer of DMAEA.MCQ/acrylamide of medium molecular weight and 1 mole % DMAEA.MCQ.

The lower the turbidity number the better the performance in solids removal. The chemical pre-treatment program according to the present invention had turbidity numbers substantially lower than the conventional resin/PEO pre-treatment program.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A method of treating bleached chemi-thermal or chemi-thermal mechanical pulp wastewater to improve retention and purification of cellulose fiber suspension and clarification of said wastewater by facilitating agglomeration of the cellulose fibers, which comprises the addition thereto of:

a cationic, water soluble polymeric coagulant having a molecular weight less than 15,000,000 in an amount of about 1 to about 300 ppm; and a nonionic polyethylene oxide flocculant having a molecular weight in the range between about 500,000 to about 30,000,000, wherein said polyethylene oxide comprises: a particulate ethylene oxide polymer present in an amount of between about 20 to about 35% by weight; an inert liquid vehicle comprising a mixture of a glycol which is present in an amount between about 25 to about 30% by weight, and glycerine which is present in an amount between about 45 to about 50% by weight, wherein the specific gravity of said ethylene oxide polymer is approximately the same as the specific gravity of said inert liquid vehicle; and a suspension agent which is present in an amount between about 0.4 to about 0.6% by weight, wherein said polyethylene oxide has a viscosity in the range between about 1800 to about 5900 cps.

2. The method according to claim 1, wherein said coagulant has a molecular weight less than 1,000,000 and is selected from the group consisting of: polycyandiamide formaldehyde polymers, amphoteric polymers, diallyl dimethyl ammonium chloride polymers, diallyaminoalkyl (meth) acrylate polymers, dialkylaminoalkyl (meth) acrylamide polymers, a polymer of dimethylamine/epichlorohydrin, a copolymer of diallyl dimethylammonium chloride and acrylamide, a copolymer of diallylaminoalkyl (meth) acrylates and acrylamide, a copolymer of dialkylaminoalkyl (meth) acrylamides and acrylamide, polyethylene imine, and polyamine.

3. The method according to claim 2, wherein said coagulant has a molar ratio of monomers from about 1% cationic to about 100% cationic.

4. The method according to claim 2, wherein said polymer of dimethylamine/epichlorohydrin has a molar ratio in the range between about 0.85:1 to about 1:1.

5. The method according to claim 1, wherein said coagulant has a molecular weight in the range between about 1,000,000 to about 15,000,000 and is selected from the group consisting of: dimethylamino ethylacrylate methyl chloride quaternary/acrylamide copolymers, dimethylaminoethyl methacrylate methyl chloride quaternary/acrylamide copolymers, dimethylaminoethyl methacrylate dimethyl sulfate quaternary/acrylamide copolymers; and diallyl dimethyl ammonium chloride/acrylamide copolymers.

6. The method according to claim 5, wherein said coagulant is either a cationic copolymer of dimethylamino ethylacrylate methyl chloride quaternary/acrylamide with 3 mole % of dimethylamino ethylacrylate methyl chloride quaternary; a cationic copolymer of dimethylamino ethylacrylate methyl chloride quaternary/acrylamide with 1 mole % of dimethylamino ethylacrylate methyl chloride quaternary; a cationic copolymer of diallyl dimethyl ammonium chloride/acrylamide with 5 mole % of diallyl dimethyl ammonium chloride; and a cationic copolymer of dimethylaminoethyl methacrylate dimethyl sulfate quaternary/acrylamide with 5 mole % of dimethylaminoethyl methacrylate dimethyl sulfate quaternary.

7. The method according to claim 1, wherein the viscosity is in the range between about 1800 to about 3200 cps.

8. The method according to claim 1, wherein said glycol is propylene glycol.

9. The method according to claim 1, wherein said suspension agent comprises a mixture of a polymeric fatty acid ester and another dispersing agent.

10. The method according to claim 1, wherein said ethylene oxide polymer is polyethylene oxide having a molecular weight in the range between about 500,000 to about 20,000,000.

11. The method according to claim 10, wherein the molecular weight of said polyethylene oxide is in the range between about 5,000,000 to about 20,000,000.

12. The method according to claim 1, wherein the specific gravity of said ethylene oxide polymer is in the range between about 1.13 to about 1.22.

13. The method according to claim 1, wherein the specific gravity of said inert liquid vehicle is in the range between about 1.11 to about 1.23.

14. The method according to claim 1, wherein said polyethylene oxide includes 25.8% of a propylene glycol, 43.4% of a glycerin, 30% of a dry polyethylene oxide, 0.15% of a fatty acid ester, 0.15% of a dispersing agent, and 0.5% of an anionic surfactant.

15. The method according to claim 1, wherein said treatment occurs either in a dissolved air flotation unit or a settling clarifier.

* * * * *